(12) United States Patent
Delzell

(10) Patent No.: US 8,488,954 B2
(45) Date of Patent: Jul. 16, 2013

(54) SYSTEM AND METHOD FOR OBTAINING PHOTOGRAPHIC AND/OR VIDEOGRAPHIC IMAGES

(76) Inventor: William Connor Delzell, San Francisco, CA (US)

( * ) Notice: Subject to any disclaimer, the term of this patent is extended or adjusted under 35 U.S.C. 154(b) by 125 days.

(21) Appl. No.: 13/147,129

(22) PCT Filed: Jan. 29, 2010

(86) PCT No.: PCT/US2010/022472
§ 371 (c)(1),
(2), (4) Date: Sep. 15, 2011

(87) PCT Pub. No.: WO2010/088440
PCT Pub. Date: Aug. 5, 2010

(65) Prior Publication Data
US 2011/0317057 A1    Dec. 29, 2011

Related U.S. Application Data

(60) Provisional application No. 61/148,307, filed on Jan. 29, 2009.

(51) Int. Cl.
*G02B 15/02*    (2006.01)
(52) U.S. Cl.
USPC ............... 396/4; 348/E5.029; 362/11

(58) Field of Classification Search
USPC .. 396/3, 4; 362/3, 11–14, 16–18; 348/E5.029
See application file for complete search history.

(56) References Cited

U.S. PATENT DOCUMENTS

| 4,236,795 | A | 12/1980 | Kephart |
| 5,704,702 | A * | 1/1998 | Goto ................................. 362/5 |
| 6,270,228 | B1 * | 8/2001 | Axen et al. ......................... 362/3 |
| 7,044,613 | B2 * | 5/2006 | Debevec ........................... 362/11 |
| 7,177,537 | B1 * | 2/2007 | Adolphi et al. .................... 396/4 |
| 7,470,044 | B2 * | 12/2008 | Maes ........................ 362/311.06 |
| 2008/0055880 | A1 | 3/2008 | Williams et al. |
| 2008/0259600 | A1 * | 10/2008 | Pohlert et al. .................. 362/235 |

OTHER PUBLICATIONS

International Preliminary Report on Patentability dated Aug. 2, 2011 in corresponding International Application No. PCT/US2010/022472.

* cited by examiner

*Primary Examiner* — Clayton E Laballe
*Assistant Examiner* — Warren K Fenwick
(74) *Attorney, Agent, or Firm* — Rankin, Hill & Clark LLP

(57) ABSTRACT

A photographic system and integrated methods thereof that makes use of four frames and light heads on robotic brackets, which can be positioned automatically using a mechanical gantry device. The lights can be positioned, rotated and adjusted automatically in response to a user input selection based on a desired photographic result selected at a user interface.

20 Claims, 3 Drawing Sheets

SYSTEM AND METHOD FOR OBTAINING PHOTOGRAPHIC AND/OR VIDEOGRAPHIC IMAGES

BACKGROUND OF INVENTION

1. Field of Invention

The present invention relates to a user controlled system and method for obtaining high quality photography and video.

2. Description of Related Art

Since the earliest ability to create a photograph man has sought to record and reproduce images of virtually all aspects of life. Photographs continue to be a main part of everyday life, whether in print or as an embedded image that advertises, sells, documents or records events. Photography and video have progressed with technology to the point where an average person is able to take acceptable photos and videos that in earlier times would have necessitated a professional to achieve comparable results. However, even with current technological advancements, when a high quality picture is required of a person or product (e.g. for an advertisement or to commemorate a special event) the services and expertise of a professional photographer are still desired.

The reason for this is that a high quality photograph and/or video requires the optimization of a multitude of settings involving backgrounds, cameras, lenses, lighting, distances etc. In addition, one must obtain the cooperation of a model or subject, whether human, material or other form. For these reasons, an experienced, trained photographer with the ability to properly sequence these variables together is typically needed.

The problem lies in the cost of services, equipment and of the greatest consequence the time and labor required to set up and complete photographs and videos that are equivalent to those of a professional quality photographer. This inconvenience is not limited to the consumer but also to the professional photographer who must maintain a stockpile of equipment and adjuncts necessary to obtain quality images. Part and parcel to a successful process is the need for the professional photographer to orchestrate numerous lights, lens settings, and distance adjustments. Further considerations include set designs or other additions, props and enhancements that are highly labor intensive. This labor often includes constant lifting and bending, climbing of stairs or ladders, and resetting heavy equipment. Often this entails the need for an assistant or assistants who can move these necessary adjuncts at the direction of the professional is responsible for the final settings but cannot be in two places at once. Additionally, all parties involved including the subject (e.g. human or product) must during this significant manipulation of adjuncts constantly traverse a minefield of electrical cords, camera, sandbags, light standards, etc. Once the process has been completed and the media assets are captured, the process begins again in reverse as gear must be disassembled for storage or repositioned for the next rendering task.

Traditionally, the use of this equipment carries with it a large energy footprint that adds not only to the earth's carbon footprint but also to the overall cost of capturing the desired images. Conventional photography and video methods often rely heavily on bright, energy taxing lights as a measure of reducing shadows, highlighting the subject and to creating a separation point from the background. With the increased capture rate of digital cameras even the slightest flaws in lighting schedules (which are also referred to as "formulas") become problematic, often encouraging the use of more lights versus less. Those familiar with achieving a professional looking photograph are aware that one single shot often requires a multitude of practice flashes and light adjustments, all of which must be constantly monitored and changed, often thus adding to net energy use.

Certain aspects of this problem have been addressed through traditional photography and video studios that maintain centralized lighting and shooting environments. However, most of these establishments require the presence of one or more skilled, trained professional photographers for the set up and completion of the photography and video process. Other studios make use of quality photo equipment used by quickly trained camera operators that may result in a high quality photograph but lack the consistency and style found in photographs made by a true professional. In all of these instances, costs associated with labor, equipment and the energy expelled remain a huge factor in the final cost to the end user, as well as the time involved for all parties. This time factor can additionally burden the subject of the image rendering, e.g. a human who must wait so long their makeup runs, or a shot involving ice cubes which melt during the time between set ups adding to the time and cost of production.

BRIEF SUMMARY OF THE INVENTION

By means of the present invention, there is disclosed an efficient, automated, programmable and transportable studio lighting and control system that creates a photographic zone that effectively manages and controls traditional exposure variables, thus facilitating the ability of the end user to obtain consistent, high quality images in a photographic (e.g. still) or video (e.g. moving) manner that allays traditional pricing barriers through the reduction of labor, time and energy costs. The system and methods introduced herein benefit the professional photographer or videographer as well as the amateur, commercial or other person who desires a cost efficient high quality image and, in certain embodiments, creates an environment where no photographer is needed. Although the system is adapted to be transportable it can be used in static applications.

The preferred embodiment described herein utilizes the combined effect of individualized essentially planar diffused panels of variable density and opacity that are grouped geometrically to create a consistent and reproducible light atmosphere that makes advantageous use of the combined effects of direct, ambient and/or indirect lighting sources. The diffused panel alignment allows reflected lighting to inherently overcome the traditional problems photographers face using conventional lighting tools and techniques thereby addressing contrast and exposure in regards to and as it relates to distance of subject matter from camera and lights (sometimes referred to as the "inverse square law"). The proximity of the lighting walls to the surrounding surfaces is critical to the look and feel of the photographs and video. Lighting formulas are pre-programmable or recordable into memory associated with a central processing unit (CPU). The CPU makes use of a database of lighting formulas that control not only the location and orientation of various light frames, but flash intensity, speed and duration, as well as additional data that can be added that conforms to the desired benefit of the user. The benefit and gain from this lighting environment is the creation of an automated exposure method that allows the user to interface without physically handling the lights. The control of the lights and the camera settings is done by simply making an entry at a user interface. Not only does this create an environment suitable for high quality photography, it eliminates the labor and training necessary to do so.

The foregoing and other features of the invention are hereinafter more fully described and particularly pointed out in the claims, the following description setting forth in detail certain illustrative embodiments of the invention, these being indicative, however, of only a few of the various ways in which the principles of the present invention may be employed.

DETAILED DESCRIPTION OF THE INVENTION

Figure 1:
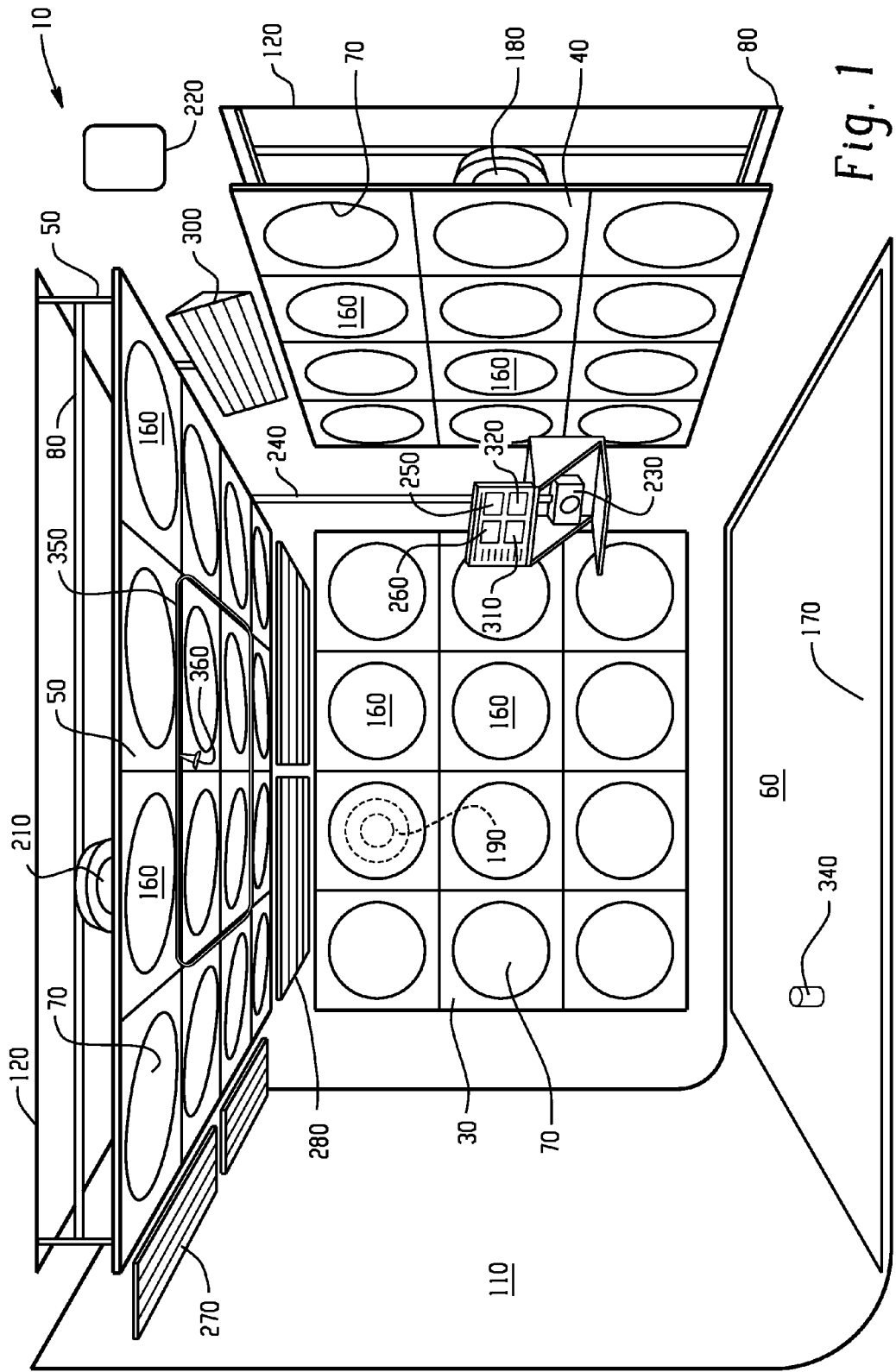
FIG. 1 schematically illustrates an exemplary system according to the invention as viewed from within a photographic zone facing a grid structure positioned to the right of the photographic zone.

As noted above, the present invention provides a system and method for obtaining high quality photographic and video images of persons and/or products. Throughout the specification and in the appended claims, the term "images" shall be understood to refer to both photographic (still) images and videographic (moving) images, unless the context clearly indicates otherwise.

The benefits of the present invention include reduced costs of time, labor, and a marked reduction in net energy usage. The present invention benefits the professional by creating an environment where quality images can be obtained at a fraction of the time, labor and cost while maintaining the highest professional standards. These reduced overhead savings can be passed on to the consumer who hires a professional or can achieve remarkable results themselves by shooting in a controlled environment without the need for a trained professional. Further benefits are applicable to businesses who can render images of multiple products or shoot video at a much faster rate, and to the public, where the carbon footprint is significantly less than those of previous image capturing studios or systems. Additional positive effects are to models, executives and celebrities that are exposed to minimal set up times and are placed in an environment where their position is not affected by the need to be on a pose line or a specific geographic area within the narrow preset boundary that is the typical presentation found in many current studio settings.

The present invention accomplishes this by providing a system and method for the professional or amateur to capture images comprising a user controlled system comprising programmable formulas that can be selected via a graphical user interface in-studio, automatically controlled lighting structures and various methods that synchronize these and other variables to obtain a professional quality result. Post picture, the system allows for restructuring for the next desired image with economy of time and movement or even more critical in the professional environment the ability to faithfully reproduce a prior lighting schedule. Of further benefit is the mobility factor of the studio that allows for transportation, when desirable (e.g. as a cost saving or client request).

In the preferred embodiment, the system makes use of four frames that support light heads on robotic brackets that have the ability to be positioned automatically using a mechanical gantry device allowing for a plurality (e.g., three or more) of fixed locations in the vertical axis and a plurality (e.g., four or more) of fixed locations in the horizontal axis. Preferably, the system comprises four lights including one key light that provides the main light on the subject, two sidelights that help to create dramatic effect and fill, and one top light, traditionally called a "hair" light, that provides directional lighting from above and can duplicate the effect of single source sunlight. While the described style is considered traditional, these lights can be used for any purpose for any subject matter that fits within the photographic zone. Additionally the lights can rotate through a range including one hundred eighty degrees away from the rear of the translucent panel, allowing the light to bounce off a reflective surface and then back through the panel to soften the effect the light has on the subject. Each light may be individually controlled by the system for on/off, movement, and rotation as well as variable levels of power, directly affecting lighting intensity.

The system also preferably includes a video lighting system that includes lights fitted between the grid walls. Of these lights, at least three are fixed position lights, located on two sides and the rear. The other is a movable light (key light) located near the camera that has the ability to be positioned at a multiplicity of locations both vertically and horizontally using a rail system. These lights are energy efficient in nature.

A background conveyer track is located behind and above the persons and/or product with which a variety of backgrounds and floor coverings that can be interchanged from the central control center. The sweeping effect of the background onto the floor beneath the persons and/or products allows for an "infinity" effect that gives no indication of where the floor and wall meet.

In the preferred embodiment the studio lighting system is controlled by means of a multiplicity of integrated software programs which interface, support and cooperate with each other and with the user who inputs instructions through a touch screen graphical user interface, although these functions may also be input through a CPU via a computer, screen or other manual control unit. A programmable logic controller (PLC) sends signals based on sensing the light head's position, as well as light intensity. Other sensors can be used to combine the signals based on sensing the up and down position of the main light, the two sidelights, and the top light. The output of all lights is based on graphical user interface inputs, which enables and allows a plurality of lighting formulas to be implemented from a single location.

The system enables a user to disregard traditional methods and instead look at a touch screen and select from a series of digital photographic examples, and to obtain the appropriate formula instantly simply by touching the desired lighting effect to be achieved. Upon being touched the CPU would generate commands that would initiate several simultaneous movements of lights via robotic gantries and position them in a predetermined spot and also adjust any flash settings or levels to attain the desired end product. For experienced or professional photographers, the touch screen includes a manual override, which allows the user to adjust the location of the lights as well as their intensity. The result from either is a photographic zone where subjects can move freely within the zone.

A key aspect to this unique method of photography is the communication link that is maintained, recorded and tracked between the CPU, the robotic frame and lights that are attached to gantries, various track control systems, the lighting power packs (e.g. strobe power packs), and of course the camera. Synchronization of a still camera operation generally includes the proper positioning of the lighting heads (key light, sidelights, and top) and power output levels and other camera settings based on desired effect.

Once all the variables are coordinated, the camera can capture images at the will of the photographer and or user, continuously (e.g. video) or automatically (e.g. preset intervals). These images are then sent to the central processing unit (CPU) where they can later be retrieved, stored or distributed, and the variables used to create the image recorded in a database for retrieval should the photographer or user wish to duplicate the rendering.

For video, energy efficient and key lighting on robotic tracks provide continuous light that is comparable to studio lighting. Video cameras are positioned in the desired places and can connect to the video control panel or be stored digitally on a computer or CPU. This data is then stored and distributed as needed.

Figure 2:
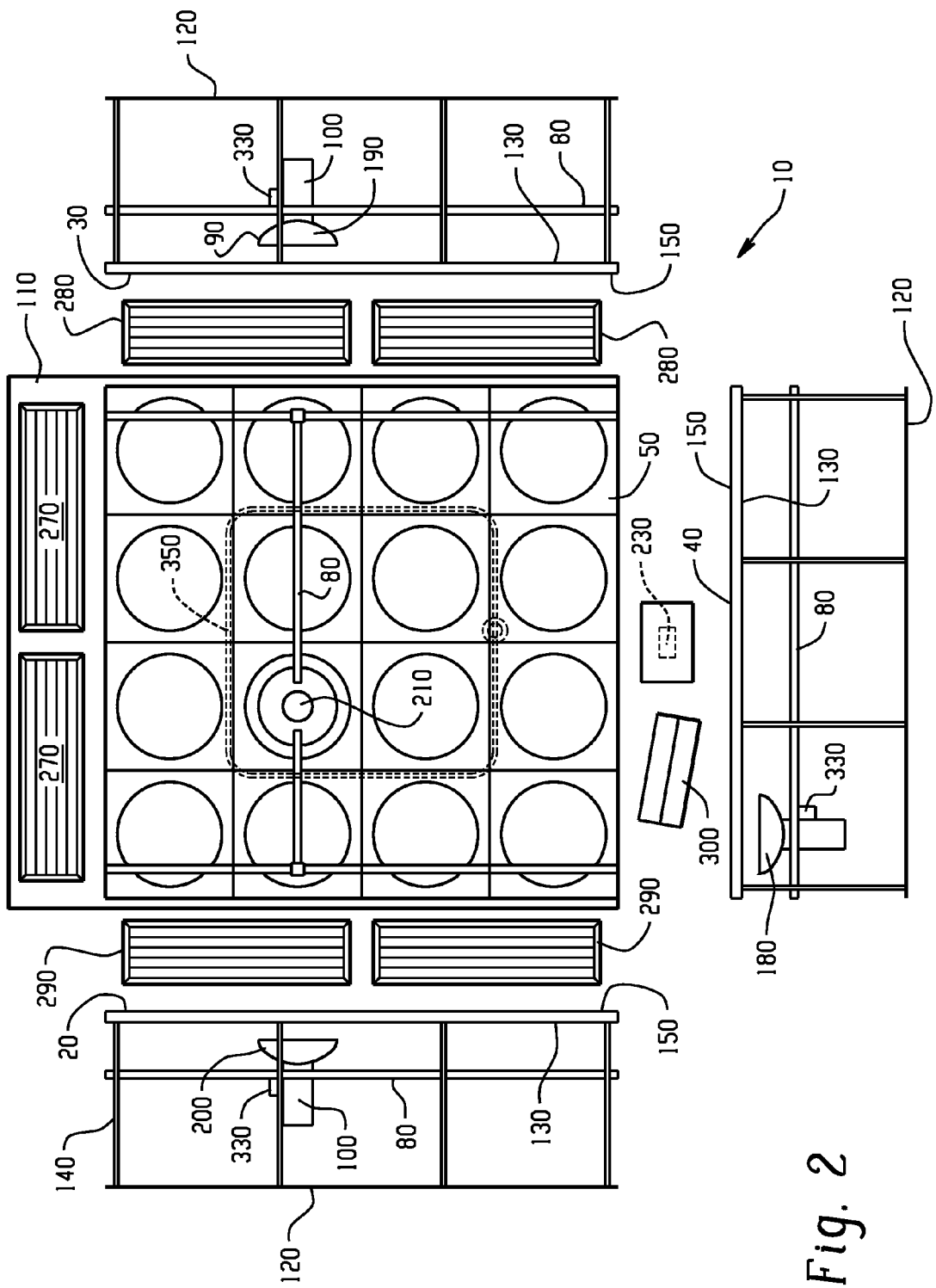
FIG. 2 is a top plan view of the system shown in FIG. 1.

FIG. 1 schematically illustrates an exemplary system according to the invention as viewed from within a photographic zone facing a grid structure positioned to the right of the photographic zone. FIG. 2 is a top plan view of the system shown in FIG. 1. The system 10 according to the invention comprises a left side grid structure 20 (not shown in FIG. 1), a right side grid structure 30, a rear grid structure 40 and an overhead grid structure 50. The two side grid structures 20, 30 are preferably similar in width and height, and are spaced apart in a facing arrangement to define substantially vertical side wall structures. The rear grid structure 40 defines a substantially vertical rear wall structure, which cooperates with the two spaced apart side grid structures 20, 30 to create a semi-enclosed area or photographic zone 60. The overhead grid structure 50 is disposed above the photographic zone 60, between the two side grid structures 20, 30 and the rear grid structure 40, with sufficient space there between to accommodate additional lighting.

The grid structures 20, 30, 40 can be mounted to stands or plates, which can be moved to a desired location via carts or other wheeled means. Grid structures 20, 30 40 are preferably free standing, and need not be secured to each other. Grid structure 50 can be adapted to be suspended from a ceiling or other overhead structure. Alternatively, grid structure 50 can be supported by bracing (not shown), which extends from grid structures 20, 30 and, optionally, 40. Each of the structures is preferably substantially unitary in design, and can be rolled or moved from a transport vehicle (e.g., a truck or trailer) to a desired location and assembled in a minimum amount of time. Mechanical and electrical connections are preferably labeled to provide clear instruction regarding the set up of the components that comprise the system.

As shown in FIGS. 1 and 2, each grid structure 20, 30, 40, 50 includes a plurality of openings 70. In the illustrated embodiment, twelve circular openings 70 are included in grid structures 20, 30, 40, and sixteen circular openings 70 are included in grid structure 50. It will be appreciated that the size, shape, number and arrangement of the openings 70 on each grid structure 20, 30, 40, 50 can be modified within the scope of the invention, as desired. The grid structures 20, 30, 40, 50 (i.e., the portion of the wall surrounding the openings 70) are preferably substantially opaque.

Associated with each grid structure 20, 30, 40, 50 is a robotic gantry system 80, which can be controlled via a computer or other controller to move, rotate and align a frame 90 and an associated light body 100 to a position relative to one of the openings 70 based upon a selection made by the user. The positioning accuracy of the gantry system 80 is preferably within a tolerance of no more than one inch. Preferably, a reflecting panel 120 is spaced away from a rear side of each grid structure, with the light body 100 located therebetween (Note: the reflecting panel 120 associated with grid 50 has been removed in FIG. 2 to allow the underlying structure to be seen). The reflecting panel 120 can be connected to the grid structure or its supports, or can be discrete therefrom (e.g., the system 10 can be positioned proximal to a wall or ceiling, which constitutes the reflecting panel 120). The reflecting panel 120 can be constructed of a material suited for the reflection of light such as sail cloth, nylon, cotton, or a similar material stretched, attached or adhered to a supporting frame (e.g. aluminum or plastic tubing) that interlocks in a manner to support the material and sized and placed in such a manner as to not interfere with any part of the system, facilitate the reflection of light and semi-enclose the structure. It should be appreciated that the reflecting panel could be constructed of other materials such as painted or pressed wood or MASONITE® or a composite material such as plastic, copolymer, foam, foil, SHEETROCK®, etc. which would produce similar desired quality of light reflection. And, as noted above, the reflecting panels 120 could be eliminated provided the grid structures were placed in proximity to a suitable reflective surface or the system 10 is installed within a room or a canopy.

FIG. 1 shows the right side grid structure 20, the rear grid structure 40 and the overhead grid structure 50 together with a background 110, which is spaced apart from and faces the rear grid structure 40 and thereby encloses the photographic zone 60. It will be appreciated that the sizing of the grid structures 20, 30, 40, 50 and the openings 70 therein will be dependent on the light bodies 100 used (e.g. diameter and the candlepower of bulbs) as well as the distance of the light bodies 100 from reflective surfaces 120, which are preferably spaced apart from a rear side 130 of the grid structures 20, 30, 40, 50 and capture the light bodies 100 there between. It should be apparent that alternative sized structures that can be proportionally larger or smaller are well within the scope of the presented invention.

In the embodiment show in FIG. 1, each grid structure 20 (not shown), 30, 40, 50 is supported by a trussed system 140 of hollow aluminum bars. It will be appreciated, however, that other lightweight materials (e.g., pipes or frames) that interconnect and lock to support the grid elements and attachments and that allow for disassembly (e.g. hinged) can be used. Suitable materials include, for example, plastics, resins, steel, carbon fiber, wood, etc. The grid structures are positioned in such a manner as to surround the photographic zone 60. The benefits of the photographic zone 60 with regard to maximizing potential space should be obvious to those familiar with photography techniques and equipment. Each grid structure has on it's forward facing side 150 (i.e., the side facing toward the photographic zone) a series of light diffusing panels 160, which are attached to the grid structures (e.g., by use of adhesive, glue, screws, hook and loop, or other common means of attachment) or have the grid structures formed thereon (e.g., by painting or masking with opaque material).

In the preferred embodiment these light diffusing panels 160 are made of square sheets of clear acrylic, although they may also be made of plastic, etched glass, polyvinyl, composites, silicone, polycarbonates, polyethylene, resin, crystals or other polymers or high or low density plastics. Multiple panels 160 may be used, or a singular full sheet that covers several openings 70 may be used. In the preferred embodiment, a plurality of panels 160 of equal size and square shape are used to facilitate ease of transport. It should be appreciated that the sheets could be of other geographical shapes such as oval, rectangular, trapezoid, round or any other common or complex shape that can effect the desired result.

The panels 160 may be diffused by the addition of an equally sized and shaped translucent panel placed behind each of the clear acrylic panels with white as the preferred color in the desired method, but could also be different in color (e.g. light gray) or diffused through the application of a covering material to give a diffused effect or by the use of acids, liquids, etching, sanding, etc. These acrylic panels are in an ideal embodiment coated with a vinyl laminate in varying shades of gray on the outer edges as to create a circle effect and focus light in the center, however, those familiar with plastics realize the laminate effect may also be created using plastic lamination, layering, paint, paper, or other light blocking materials.

An example of a preferred method of creating a photographic zone using grid structures and light diffusing panels would be to construct three identical grid structures in such a manner as each grid structure supports twelve equal sized diffused panels that are identical in size, e.g. each panel is square in shape and three feet in length on each side and placed and arranged in such a manner as the diffused panels all face the same direction and create a grid that is rectangular in shape and measures four panels across and three panels high (in this example each completed grid structure would measure twelve feet on the bottom and top and nine feet on either side). A forth panel would be constructed using light diffusing panels identical in size to the others with one additional row of diffused panels as to create one grid structure which would be square in shape with four rows of three foot panels placed next to each other in such a manner as to measure twelve feet from corner to corner on any side. A first rectangular grid structure would be placed vertically on a level surface (e.g. floor or platform) as to create a substantially planar vertical wall panel. A second rectangular vertical wall panel would be placed parallel to the first in such a manner as the face of one grid structure faces the other and they are aligned uniformly and in this example spaced sixteen feet apart. These panels create the two side walls of the photographic zone. To the rear of each of the side panels is attached a reflecting panel as described herein that is parallel and aligned to the face each structure in such a manner as the structure is centered from edge to edge of the panel except for the base, that the panel is spaced three feet from the face of the structure at any point and extends outwardly from the sides and top of the grid structure eight feet from either side and three feet above the top edge of each structure. The remaining third rectangular grid structure would be placed perpendicular to and equally spaced from the first two at a point that is equal on either side to the other two panels but eight feet in distance from the edge of each, and would create the rear of the photographic zone. This rear structure would have a reflecting panel attached in a similar manner of the others with a similar top extension but side extensions of three feet from the edge at either side. The fourth square panel would be placed horizontally at the level one foot above the top edge of the side panels whereby the face of the panel is ten feet high at any point from the floor and at any point measured from the edge to be two feet from the face of either of the side panels and also aligned in such a manner as to also be aligned one foot above the top of the rear panel and at any point be eight feet from the rear panel. This top panel would have attached to it a reflecting panel that is three feet from the face of the panel at any point and extends toward each side panel two feet at any point and extends to the rear reflecting panel eight feet and extends to the remaining forward area eight feet and finishes the semi-enclosed area. A background, as will be explained in greater detail below, would be placed in a similar manner in the remaining opening (front) and be initially perpendicular and aligned in a similar manner as the rear panel described but as those familiar with photography know may be tapered, curved, or placed in such a fashion as to support the desired effect sought by the photographer. In this example the semi-enclosed photographic zone created would be an area ten feet high, sixteen feet wide and twenty-four feet in length providing a workable floor area of more than three hundred fifty square feet. In the aforementioned example the reflecting panels could be eliminated provided the room was suitable in size and prepared properly, in the case above the system could be built without reflecting panels in a rectangular room or enclosure that measures twenty-two feet by thirty feet.

The background system 110 permits the background and floor 170 (which itself can advantageously be formed of an acrylic or other commonly accepted flooring material) to be automatically adjusted similar to how a conveyer belt or theatrical backdrop operates.

A portrait lighting system is administered via lights, which are positionable by the gantry system 80 associated with each grid structure 20, 30, 40, 50. The portrait lighting system comprises a main "key" light system 180, a camera right side light system 190, a camera left side light system 200, and a top "hair" or overhead light system 210 (see FIG. 2). Each light system 180, 190, 200, 210, which includes an associated frame, is connected to a motorized carriage (also sometimes referred to herein as a "robotic bracket") movably connected to the rear of the grid structure by a gantry system 80, and is controlled remotely for on/off, X-Y axis movement, rotation (i.e., orientation relative to the photographic zone 60) and power level as explained in greater detail below. One or more strobe power packs 220 control the power of the lights.

Figure 3:
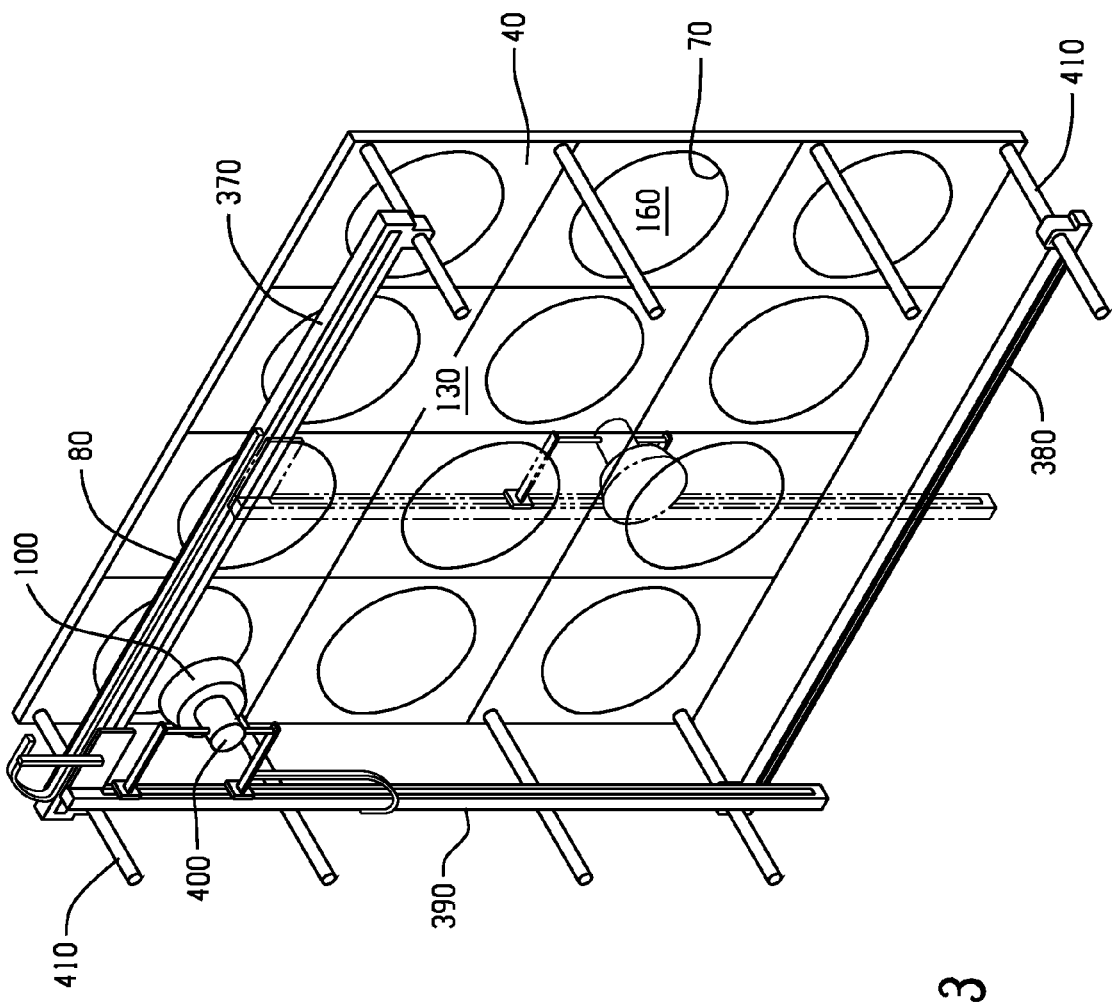
FIG. 3 is a perspective view of a preferred embodiment of a lighting gantry.

FIG. 3 is a perspective view of a portion of a grid and lighting gantry according to the invention. For ease of illustration, a rear grid structure 40 is shown, but it will be appreciated that the same structure and components are present in the other grid structures, 20, 30 and 50. A gantry 80, which in the illustrated embodiment includes two horizontal tracks 370, 380 and one vertical track 390, is associated with the grid structure 40. It will be appreciated that other arrangements could be used, if desired (e.g., one horizontal track and two vertical tracks). The gantry 80 comprises a motorized carriage 400 operatively associated with a light body 100. The gantry 80 facilitates movement of the light body 100 along an X-axis (left and right movement) and along a Y-axis (up and down movement). In addition, the gantry 80 facilitates rotation of the light body 100 toward and away from the rear side 130 of the grid structure through at least a 180° axis of rotation (this position is illustrated in a dashed-line view in FIG. 3). The gantry 80 is preferably mounted to a plurality of rods 410, which extend from the rear side 130 of the grid structure. The rods 410 can also support a reflective surface 120.

A camera 230 is preferably disposed in an appropriate location within the photographic zone 60 in fixed or fixable position. In the illustrated embodiment, the camera 230 is attached adjustable monopod 240 such that it's height and left and right location can be adjusted (automatically or manually) and fixed. The camera 230 can be of any type as favored by the user with the preferred type being one that can interface with conventional image capture equipment (e.g. a computer 250, digital storage device or memory or other image capturing and or displaying adjunct) as well as the strobe power pack 220 and is surrounded by a teleprompter device 260, which displays images captured by the camera 230 immediately, or can be used for direction, playback, etc. An advantage of the location of the teleprompter 260 is for instant viewing of a photograph when a photographer is not present and the camera 230 is shooting in an automatic or timed mode (i.e., the image can be seen by the person being photographed without having to move).

The system 10 further preferably comprises an energy efficient (e.g. fluorescent) video lighting system. In a preferred embodiment, the video lighting system comprises at least one and preferably two background lights 270 located above the background 110, at least one and preferably two floor camera right lights 280 located above the floor 170 to the right of the camera 230, at least one and preferably two floor camera left lights 290 located to the left of the camera 230, and one or more main key lights 300 located above the camera 230. The background lights 270, and floor camera right lights 280 and floor camera left lights 290 can be fixed (i.e., immovable). However, the key light 300 preferably has the ability to be positioned in a multiplicity of locations both vertically and horizontally. In an ideal environment each bank of lights uses four aligned tube shaped bulbs identical in wattage and quality of light, and are four feet in length, although longer or shorter or different shaped bulbs could be used that equally distribute the desired light.

In the preferred embodiment, a graphic user interface ("GUI") 310 allows users to automatically select the desired lighting style by means of a touch screen 320 or other input device (e.g., computer keyboard, game controller, preset motorized controller, mobile phone interface, vocal command receiving unit etc.). Controllers 330 control both the placement and the output of the lights and, based on both sensed and graphical user interface inputs, enable a plurality of lighting formulas to be implemented from a single location without the need for the photographer to manipulate the lights. One or more wired or wireless sensors 340 can be placed in the photographic zone 60 to measure light.

In one preferred embodiment, a user encounters a graphic user interface ("GUI") that displays a plurality of images such as, for example, various famous portraits or music album covers. The user can review the menu of images and then make a selection by, for example, touching a touch screen. The CPU would process the request by accessing the necessary database of lighting formulas, and would initiate commands to the controllers to move and/or rotate the various lights to the position required to duplicate the lighting effect displayed in the selected image and, optionally, position the camera and set its variables (focal length, shutter speed, lens type etc.) as needed. The lights (key, hair etc.) would move to the appropriate location and position simultaneously along tracks attached to the gantries in the rear of the grid structures until all of the lights necessary to produce the selected lighting effect were in the proper position. Dependant upon the requirements necessary to duplicate the lighting effect in the selected image, the light units may align or misalign with the openings in the grid covered by the light diffusing panels and/or may face towards or away from the photographic zone. The settings of the lights intensity and power would also be set by the controller/CPU and coordinated with the strobe. The user (or his or her subject) would face the camera and receive any further instructions or reminders on a teleprompter, and be able to view images as they are captured. Throughout the process, the subject would be surrounded by properly spaced lighting, allowing the subject to move away or toward the camera without any degradation to the lighting effect within the photographic zone.

In a further embodiment the graphic interface may be incorporated into the teleprompter while maintaining touch screen ability, in a manner similar to a computer touch screen commonly found in stores or home computers. Additionally the CPU continuously records and updates the central database via a log or memory. This updated database allows for reproducing results of any kind. As a further example a professional photographer may wish to override preprogrammed settings to achieve a desired result. The CPU would recognize the movements and log each movement of individual light frames as well as any other adjustments (e.g. light speed or intensity) and store any new configuration as and accessible setting available for recall.

The software that drives the hardware of the unit has an aspect of the software that we refer to herein as the subsystem. This subsystem controls and gives motion, intensity, firing, and any individual instructions require by individual hardware pieces in the unit. This may include the intensity, color, and direction of a light source, or, the location, focal length, and speed of a camera. Any individual piece of hardware like exampled but not limited to the above must be individually controlled. This subsystem is a package of software that controls all of these functions seamlessly though a cohesive program running on a CPU driven automatically, manually, or remotely.

The software that drives the unit also has an aspect of the software herein referred to as the output interface. Every still, video, or motion capture device once used outputs raw imaging data to the imaging pipeline or unit infrastructure. The output aspect of this software set the delivery parameters that the unit delivers this raw data to the user. This is not limited to converting raw still to formats (e.g., .jpg) at smaller sizes, converting raw video to 3D instantly viewable content, or converting raw sensor video (bayer or non-bayer patterned) to easily usable lower resolution or simply greater compressed quality. By setting this output interfaces options one may use the system to acquire any format, size, or style of stills, video, or motion capture one could wish. This system could be updated as new output formats or technologies are become useable. The user experience of raw data capture to their quickly usable delivery format would be seamless. It should be noted that this output interface can be used in a stand alone mode but by default is highly integrated with the rest of the software systems.

The software that drives the unit would also have a manual control user interface. This advanced software function allows the user through either a graphic user interface ("GUI") or through pure console text to adjust any aspect of the subsystem individually. This provides maximum control of the unit to the user and includes manual control of every single sub-function on the unit. This manual control interface also allows the memorization of the parameters for the unit set by the user for fast recall.

The software that drives the unit also has a main GUI that can drive the unit in a more semi-automatic mode. This GUI takes preset advanced software functions from above and organizes these memorized patterns into a tiered choice driven interface. The user can by using this GUI either search for a specific style, look, creator, or era of lighting and shooting style by a text field or a contextually tiered database. Each of these presets from the advanced functions will include a reference image in the GUI as an example of the look that the preset creates. The tiering of the menus will be in a familiar style so not as to overwhelm the user with too many choices from the start. An example of this would be the top level of the menu could be PORTRAIT. The next level of choices could be FASHION, CLASSIC or NATURAL LIGHT. In the fashion sub-menu one tier down you could have NEW YORK, HIGH KEY, LOW KEY, RING or BACK LIGHT. These are of course examples and there would be hundreds of choices, thousands, or even tens of thousands of choices, as desired. Each of these choices could be recalled through a favorites menu for fast recovery of user highly used or preferred choices. These software functions could be stand alone or integrated and all could interact with each other. The full power of the system is realized once all systems are used by the user as a fully integrated unit.

Thus, a four light portrait lighting system is administered, which includes a main "key" frame and light system that has the ability to move along the gantry located to the rear of the grid structure both vertically and horizontally, a camera right side frame and light that has the ability to move along a gantry both vertically and horizontally, a top "hair" frame and light that has the ability to move along a gantry horizontally, and a camera left side frame and light that has the ability to move along a gantry both vertically and horizontally. Each light is controlled for on/off, forward/backward, and power level as explained.

In the preferred embodiment there is attached to the overhead grid structure 50 a track 350 which contains one or more adjustable, moveable lights 360, which is similarly attached by a robotic mounting bracket or motorized carriage and is moved remotely by the CPU along the track in concert with the desired light schedule. As can be appreciated by those having skill in the art, these lights can also be moved by other means, such as motorized units, remote control, preset stops, manually, etc.

The camera 230, which in the preferred embodiment is mounted to the overhead grid structure via an adjustable monopod 240, and next to it the teleprompting device 260, which immediately displays images captured by the camera 230. Although less desirable both these components could be mounted from a ceiling bracket or floor bracket or on an arm extended horizontally from the rear or side of the photographic zone. The camera 230 could also be equipped with a sensor, which senses its position within the photographic zone 60 and, based on calculations made by the processor, automatically adjusts the lighting formula as necessary to achieve the desired image.

It should be appreciated that individual parts of the system are preferably made of lightweight materials and connected permanently as to become components that are part of a kit that quickly assembles and disassembles for use. As an example each grid structure could be designed as a single unit comprised of the grid structure 20, light diffusing panels 160, a reflecting panel 85, gantry 80, frame 90 and light body 100. These units may be sectional (e.g. three panels high), have wheels or casters, fold inward or outward, or collapse so as to fit easily in a truck, van, etc. Their generally planar design and narrow footprint would only contribute to ease of movement and storage. Additionally a kit could be comprised of the monopod 240, camera 230, and teleprompter 260, which would be adapted to connect quickly to the overhead grid structure 50. Separate components in a desired transportable configuration could be added by attaching the energy efficient lights 270, camera lights 280, 290 and key lights 300 to brackets that would quickly and efficiently connect to the assembled grid structure assembly as well as the elliptical track 350 for lighting the photographic zone 60. The advantage of creating a component system that becomes a kit is a substantial savings in the time and labor it takes to set up verse creating a suitable photographic environment from disarray of adjuncts as well as the ability to have each aspect of the environment re-creatable in a separate location.

As noted above, the present invention provides substantial advantages when compared to prior art devices. Adolphi et al., U.S. Pat. No. 7,177,537 B1, for example, discloses an automated studio with coordinated lights and sensors that lock out or prevent operation of an associated camera if a sensor fails to verify a subject to be photographed in the proper position. An improvement and advantage provided by the present invention is that a subject wishing to be photographed can move freely throughout their entire photographic zone, and a quality resolution can be had regardless of the subject moving side to side and either closing or increasing distance from the main camera. This ability to move without adversely affecting final image quality is a key aspect of the present invention. Freedom of movement creates a much more relaxed atmosphere for the model(s), which no longer need to spot themselves on a predetermined mark, pose line, stool or spot and are not hindered by actual or perceived lack of spontaneity, audible alarms or other distracters that are part and parcel to many other photographic systems. This is essential for non-professional or photo-phobic subjects who may have a high level of apprehension prior to initializing the photographic sequence, or when the subject of the rendering has a finite working time, such as a hatching chicken egg that may move unpredictably and cannot wait for reposition of lighting or a small animal chasing prey.

Thomas et al., U.S. Pub. App. No. US2005/0099603 A1, discloses a chroma key background system and process which by current standards is analogous to much of the commercially available rendering software in use by photographers of all skill levels. The Thomas et al. system relies on calculated masking of light and is designed primarily for positioned actors simulating scenes and overlapping images to create a particular effect. The present invention differs by providing a standard, reproducible photographic zone without the need to specifically geographically position actors or products or to make a long series of adjustments prior to shooting. One simply enters the photographic zone and is instantly within the predetermined proper lighting schematic. At the same time images are captured repeatedly and continually with comparable resolutions against the preferred background or other suitable setting for commercially available rendering of products.

Axen et al., U.S. Pat. No. 6,270,228 B1, discloses plural parallel lighting with removable or attachable gel light diffusing filters. The present invention relies on uniform, staggered or opposing light patterns and schedules that are coordinated by means of an automated system. While certain configurations of the automated, the present invention may result in an occasional parallel alignment of lights, the system significantly differs as it eliminates the need to manually transform or change lens or filters, block or add lights, covers, etc., or add or remove panels, all of which can be time consuming as well as alter the ability to recreate precisely a previously preferred photographic environment. Instead of a light table, cove or dome it creates an entire photographic zone where subjects can move or be moved freely that can also be recreated literally in a matter of seconds during the same photographic session or in future sessions as desired.

Debevec, U.S. Pat. No. 7,044,613 B2, discloses the use of computer aided image capture and integrations while teaching an illuminated dome or spherical configuration in which lights are substantially proportional but vary in wavelength and color. The present invention makes use of environmentally friendly lighting that varies in wavelength through a series of preset panels that encourage proportionate lighting within a photographic zone that is essentially rectangular in shape and reduces camera distance factors.

Williams et al., U.S. Pub. App. No. US2008/0055880 A1, discloses the use of plastic panels and fluorescent lighting with but relies on a platform system, whereas the present invention uses a grid system of panels to create a photographic zone that is not reliant on a singular raised podium or stand. The independence from a fixed geographic location allows subjects to move freely and where image quality is not affected by a change in distance from the preset camera.

Maes, U.S. Pat. No. 7,470,044 B2, discloses the use of translucent panels but relies on a process and means of reflecting the light that is similar in many respects to the traditional umbrella type light diffusion adjunct that any professional photographer would be familiar with and is accompanied by the same set of problems which include manual alignment, manual setting of panels and the need to have a room or structure that is cooperative (e.g. sized and painted) to benefit the invention. Maes does not contemplate the need for multiples of subjects, automated and/or robotic light diffusing schematics, or close proximity shooting that may occur should the subject move toward the light source.

Of critical importance and difference to all of the aforementioned prior art is the ability of the present invention to be transported efficiently from locale to locale without any perceivable change in the ability to capture images, nor in the quality of same. Another factor that differentiates the present invention is the use of one hundred eighty degree automatically rotating lights and their effects on the photographic process. A further distinction of the present invention is the total working area allowed the user and or subject which is a result of planar wall structures that maximize the total photographic area by capturing and directing light which allow subjects to move freely therein without significant degradation of images or the confines of the inverse square law.

What is claimed is:

1. A system for obtaining photographic and/or videographic images, the system comprising:
   a processor;
   a memory operatively associated with the processor;
   a database comprising a plurality of lighting formulas stored in the memory;
   a graphic user interface operatively associated with the processor, said graphic user interface being adapted to display an image associated with each of said plurality of lighting formulas to a user, and to transmit a user selection to the processor; and
   a motorized carriage operatively associated with the processor, said motorized carriage supporting a light for illuminating a photographic zone;
   wherein, the processor is adapted to send a command to the motorized carriage to position and orient the light with respect to the photographic zone based on the user selection transmitted from the graphic user interface to the processor.

2. The system according to claim 1 further comprising a camera operatively associated with the processor.

3. The system according to claim 2, wherein the processor adds lighting formulas and associated images to the database based on photographic and/or videographic images obtained using the camera.

4. The system according to claim 2, wherein the database further comprises one or more parameters selected from the group consisting of flash intensity, speed, duration.

5. The system according to claim 2 wherein said graphic user interface functions as a teleprompter and displays photographic and/or videographic images obtained by the camera.

6. The system according to claim 1, wherein the graphic user interface is a touch screen.

7. The system according to claim 1 further comprising a second motorized carriage operatively associated with the processor, said second motorized carriage supporting a second light for illuminating the photographic zone, wherein the processor is adapted to send a command to the second motorized carriage to position and orient the second light with respect to the photographic zone based on the user selection transmitted from the graphic user interface to the processor.

8. The system according to claim 7 further comprising a third motorized carriage operatively associated with the processor, said third motorized carriage supporting a third light for illuminating the photographic zone, wherein the processor is adapted to send a command to the third motorized carriage to position and orient the third light with respect to the photographic zone based on the user selection transmitted from the graphic user interface to the processor.

9. The system according to claim 8 further comprising a fourth motorized carriage operatively associated with the processor, said fourth motorized carriage supporting a fourth light for illuminating the photographic zone, wherein the processor is adapted to send a command to the fourth motorized carriage to position and orient the fourth light with respect to the photographic zone based on the user selection transmitted from the graphic user interface to the processor.

10. The system according to claim 1 further comprising a grid structure positioned proximal to the photographic zone, said grid structure comprising a plurality of discrete light-diffusing panels each having a front side facing the photographic zone and a rear side facing away from the photographic zone, said light being positionable and orientatable by said motorized carriage relative to the rear side of one of the plurality of discrete light-diffusing panels.

11. The system according to claim 1 further comprising one or more sensors operatively associated with said processor, said sensors detecting light proximal to the photographic zone.

12. A method for obtaining photographic and/or videographic images, the method comprising:
   providing a system comprising
      a processor,
      a memory operatively associated with the processor,
      a database comprising a plurality of lighting formulas stored in the memory,
      a graphic user interface operatively associated with the processor, and
      a motorized carriage operatively associated with the processor, said motorized carriage supporting a light for illuminating a photographic zone;
   displaying an image associated with one of said plurality of lighting formulas to a user on the graphic user interface; and
   transmitting a user selection made using the graphic user interface to the processor;
   wherein, the processor sends a command to the motorized carriage to position and orient the light with respect to the photographic zone based on the user selection transmitted from the graphic user interface to the processor.

13. The method according to claim 12, wherein the system further comprises a camera operatively associated with the processor and wherein the method further comprises adding lighting formulas and associated images to the database based on photographic and/or videographic images obtained using the camera.

14. The method according to claim 13, further comprising using the graphic user interface as a teleprompter to displays photographic and/or videographic images obtained by the camera to the user.

15. The method according to claim 12, wherein the graphic user interface is a touch screen.

16. The method according to claim 12, wherein the system further comprises a second motorized carriage operatively associated with the processor, said second motorized carriage supporting a second light for illuminating the photographic zone, and wherein the method further comprises sending a command from the processor to the second motorized carriage to position and orient the second light with respect to the photographic zone based on the user selection transmitted from the graphic user interface to the processor.

17. The method according to claim 16, wherein the system further comprises a third motorized carriage operatively associated with the processor, said third motorized carriage supporting a third light for illuminating the photographic zone, and wherein the method further comprises sending a command from the processor to the third motorized carriage to position and orient the third light with respect to the photographic zone based on the user selection transmitted from the graphic user interface to the processor.

18. The method according to claim 17, wherein the system further comprises a fourth motorized carriage operatively associated with the processor, said fourth motorized carriage supporting a fourth light for illuminating the photographic zone, wherein the method further comprises sending a command from the processor to the fourth motorized carriage to position and orient the fourth light with respect to the photographic zone based on the user selection transmitted from the graphic user interface to the processor.

19. The method according to claim 12, wherein the system further comprises a grid structure positioned proximal to the photographic zone, said grid structure comprising a plurality of discrete light-diffusing panels each having a front side facing the photographic zone and a rear side facing away from the photographic zone, said light being positionable and orientatable by said motorized carriage relative to the rear side of one of the plurality of discrete light-diffusing panels.

20. The method according to claim 12, wherein the system further comprises one or more sensors operatively associated with said processor, and wherein said method further comprises detecting light proximal to the photographic zone using the one or more sensors.

* * * * *